(12) United States Patent
Wang

(10) Patent No.: US 8,290,735 B2
(45) Date of Patent: Oct. 16, 2012

(54) TEST APPARATUS AND TEST METHOD FOR UNIVERSAL SERIAL BUS INTERFACE

(75) Inventor: Cho-Hao Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 618 days.

(21) Appl. No.: 12/551,473

(22) Filed: Aug. 31, 2009

(65) Prior Publication Data

US 2011/0040516 A1 Feb. 17, 2011

(30) Foreign Application Priority Data

Aug. 12, 2009 (CN) .......................... 2009 1 0305548

(51) Int. Cl.
*G01R 31/00* (2006.01)
(52) U.S. Cl. ...................................................... 702/117
(58) Field of Classification Search .................. 702/108, 702/117–119, 122, 183, 185
See application file for complete search history.

(56) References Cited

U.S. PATENT DOCUMENTS

| 2003/0056036 A1* | 3/2003 | Carlton ............................ 710/15 |
| 2008/0052507 A1* | 2/2008 | Chow et al. ........................ 713/2 |
| 2009/0216517 A1* | 8/2009 | Herbst et al. ..................... 703/21 |

* cited by examiner

*Primary Examiner* — Mohamed Charioui
(74) *Attorney, Agent, or Firm* — Altis Law Group, Inc.

(57) ABSTRACT

A test apparatus for testing USB interfaces of an electronic device. The test apparatus includes a number of USB interfaces connected to the USB interfaces of the electronic device via cables respectively, to communicate with the electronic device. A memory stores a special file, to note phrases generated during test. A single-chip is connected to the number of USB interfaces, a power switch, and the memory, and stores a preset phrase. When the power switch is turned on, the single-chip writes a ready phrase in the special file, when one of the USB interfaces of the electronic device passes test, the single-chip reads a test phrase from the special file and writes a test finish phrase in the special file and controls the test apparatus to test a next USB interface of the USB interfaces of the electronic device.

6 Claims, 3 Drawing Sheets

TEST APPARATUS AND TEST METHOD FOR UNIVERSAL SERIAL BUS INTERFACE

BACKGROUND

1. Technical Field

The present disclosure relates to test apparatuses and test methods, and particularly, to a test apparatus and a test method for testing universal serial bus (USB) interfaces.

2. Description of Related Art

Today, USB technology is broadly applied in serial communication solutions and becomes more and more important. Before selling or using electronic devices having USB interfaces, the USB interfaces need to be tested. A conventional method for testing USB interfaces is using some conventional USB devices such as USB mice, USB keyboards, USB hard disk drives, etc., to directly connect with the USB interfaces, and inspecting working status of the USB devices to determine whether the USB interfaces work properly or not. However, this method requires plugging or unplugging the USB devices to or from the USB interfaces frequently, which is unduly laborious and time-consuming, and may eventually damage the USB devices.

DETAILED DESCRIPTION

Figure 1:
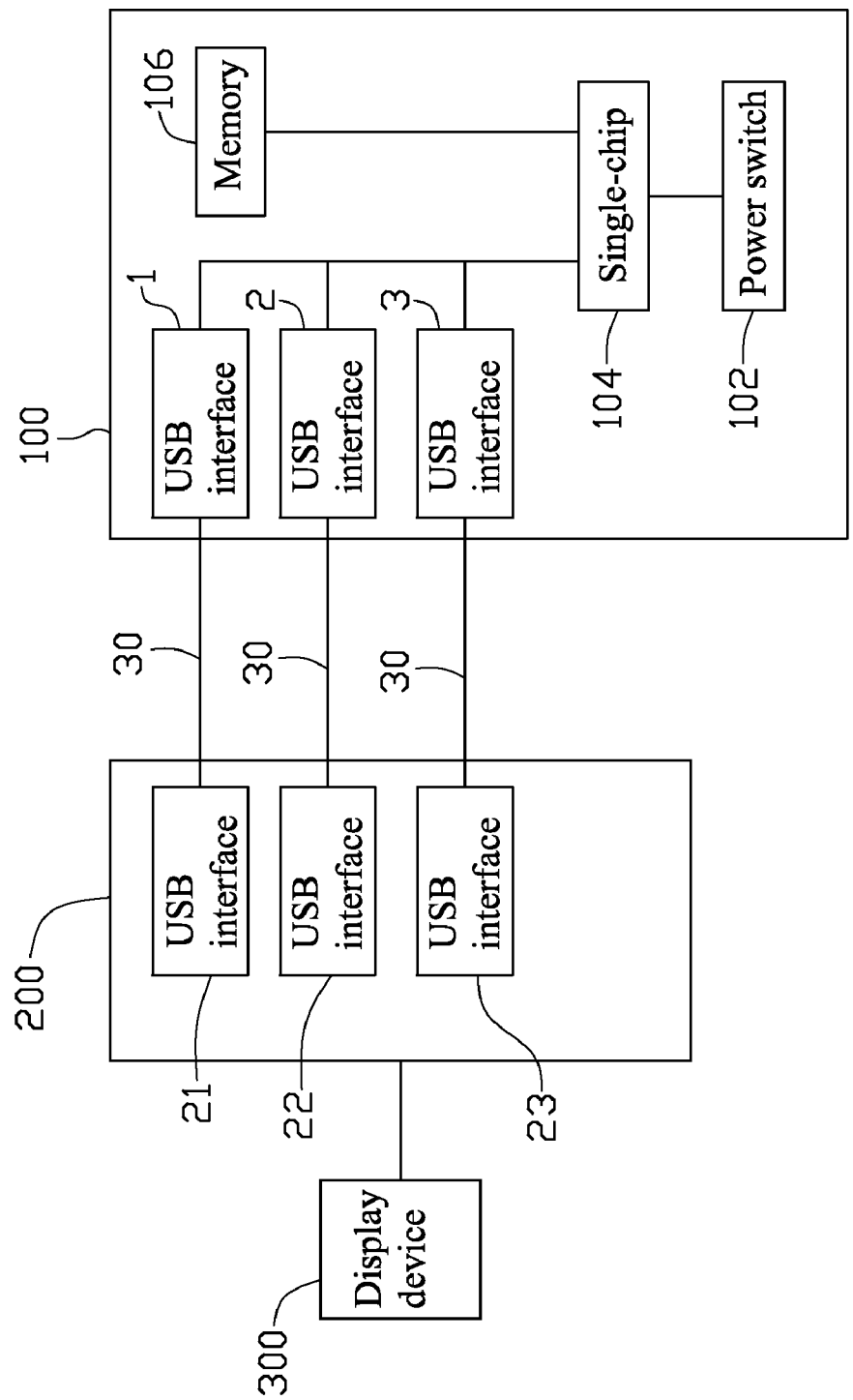
FIG. 1 is a block diagram of an embodiment of a test apparatus for universal serial bus (USB) interfaces.

Referring to FIG. 1, an exemplary embodiment of a test apparatus 100 is provided for testing universal serial bus (USB) interfaces of an electronic device, such as a computer motherboard 200. The test apparatus 100 includes a plurality of USB interfaces, a power switch 102, a single-chip 104, and a memory 106. In one embodiment, the USB interfaces of the motherboard 200 includes three USB interfaces 21-23, and the plurality of USB interfaces of the test apparatus 100 includes three USB interfaces 1-3. The single-chip 104 is connected to the USB interfaces 1-3, the power switch 102, and the memory 106.

The USB interfaces 1-3 of the test apparatus 100 are connected to the USB interfaces 21-23 of the motherboard 200 via three cables 30, respectively, to communicate with the motherboard 200. The power switch 102 is configured to turn on or turn off the test apparatus 100. The memory 106 is configured to store a special file, which notes phrases generated during testing, such as test phrases. The single-chip 104 is configured to store a preset phrase, such as "Test01", write a ready phrase, such as "Ready" in the special file when the power switch 102 is turned on, read a test phrase, such as "Test07" from the special file stored in the memory 106 when one USB interface of the motherboard 200 passes test, write a test finish phrase, such as "OK07" in the special file, and control the test apparatus 100 to test a next USB interface of the motherboard 200 according to the test finish phrase.

Each generated phrase is appended to the end of the special file without replacing former phrases in the special file, and a space phrase can be inserted into the generated phrases for dividing the generated phrases. When a predetermined file size for the special file is reached, the single-chip 104 outputs a control signal to clear all phrases in the special file, and then phrases can be written in the special file again.

In one embodiment, the power switch 102 includes a button set on a surface of the test apparatus 100. The single-chip 104 is an 8051 type single-chip. The memory 106 is a flash memory. In other embodiments, the memory 106 may be an exterior storage device, such as a hard disk drive (HDD), connected to the single-chip 104 via an interface, such as a USB interface.

The motherboard 200 is connected to a display device 300. The display device 300 is configured to display a test result of each USB interface of the motherboard 200. The motherboard 200 further includes other elements (not shown), the other elements are known elements of general computer, such as a center processing unit. Test programs for testing the plurality of USB interfaces of the motherboard 200 are stored in an HDD of the motherboard 200. In one embodiment, the display device 300 is a display.

Figure 2A:
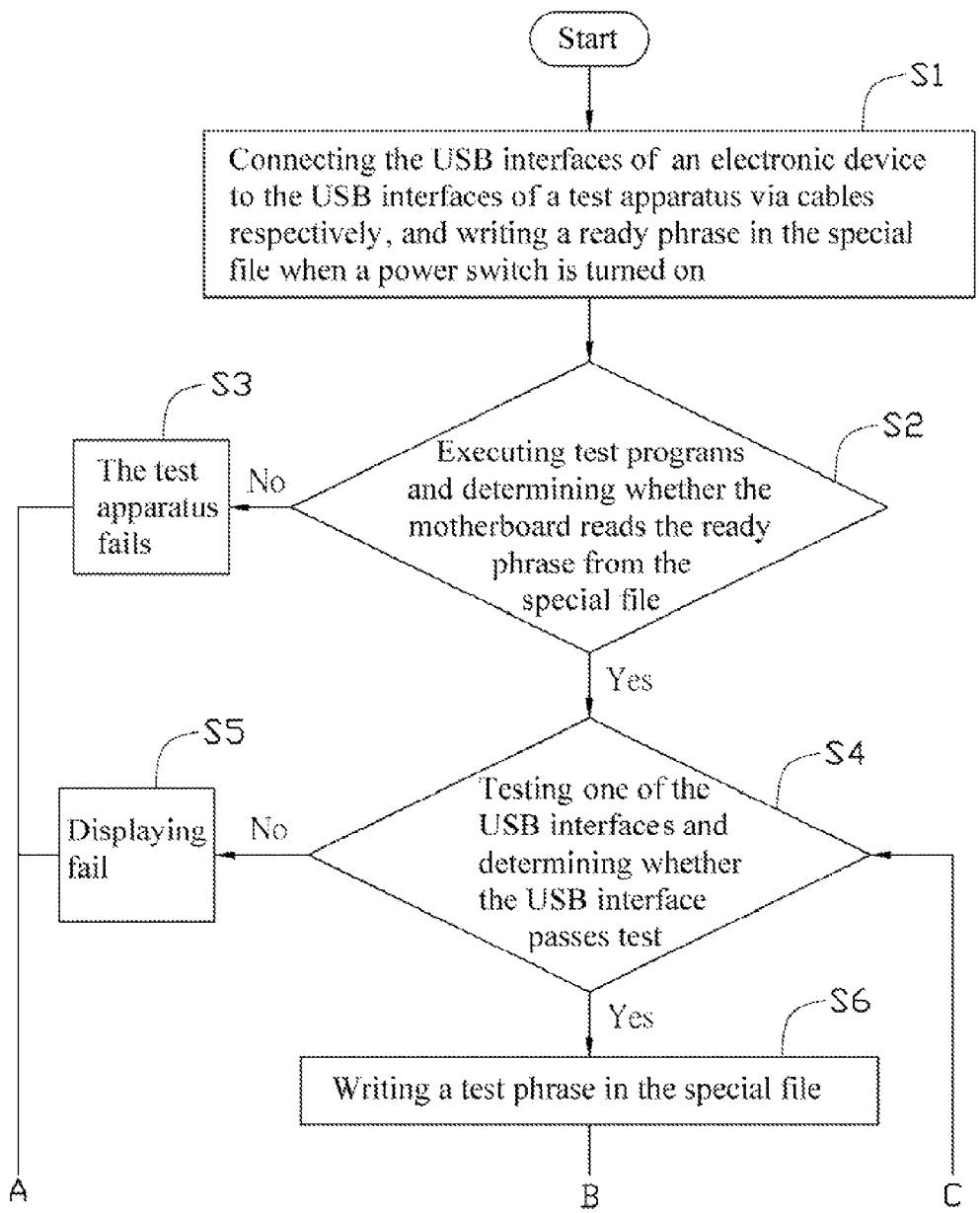
FIGS. 2A-2B is a flowchart of an embodiment of a test method for USB interfaces.
Figure 2B:
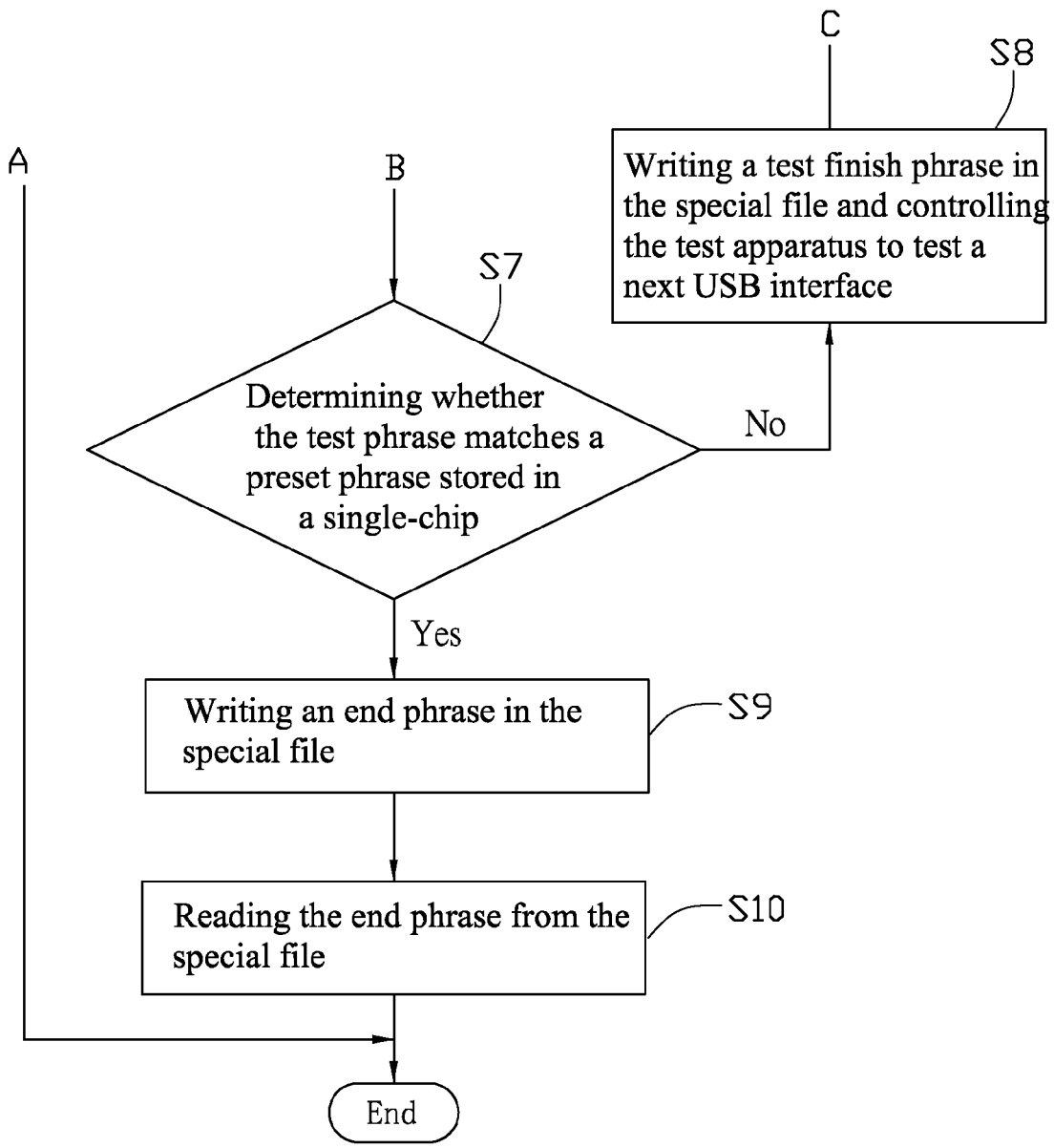

Referring to FIGS. 2A and 2B, an exemplary embodiment of a test method for USB interfaces includes the following steps.

In step S1, the USB interfaces 21-23 of the motherboard 200 are connected to the USB interfaces 1-3 of the test apparatus 100 via cables 30, respectively, the power switch 102 is turned on, the single-chip 104 writes a ready phrase, such as "Ready" in the special file stored in the memory 106.

In step S2, determine whether the motherboard 200 reads the ready phrase from the special file when the test programs in the motherboard 200 are executed, if the motherboard 200 fails to read the ready phrase from the special file, the procedure goes to step S3, if the motherboard 200 reads the ready phrase from the special file, the procedure goes to step S4.

In step S3, the test apparatus 100 fails and the test ends.

In step S4, the test programs test one of the USB interfaces 21-23 of the motherboard 200, such as the USB interface 21, and determines whether the USB interface passes the test, if the interface 21 does not pass, the procedure goes to step S5, if the interface 21 passes, the procedure goes to step S6.

In step S5, the display device 300 displays fail, such as "fail", and the test ends.

In step S6, the test programs write a test phrase, such as "Test03" in the special file.

In step S7, the single-chip 104 determines whether the test phrase matches a preset phrase, if the test phrase does not match the preset phrase, the procedure goes to step S8, if the test phrase matches the preset phrase, the procedure goes to step S9.

In step S8, the single-chip 104 writes a test finish phrase, such as "OK03" in the special file, and controls the test apparatus 100 to test a next USB interface of the motherboard 200, such as the USB interface 22, and the procedure goes back to step S4.

In step S9, the single-chip 104 writes an end phrase, such as "EndTest" in the special file.

In step S10, the test programs read the end phrase from the special file, and the test ends. The test apparatus 100 can test the plurality of USB interfaces of the motherboard 200 automatically. The test apparatus and test method is simple and effective for testing USB interfaces.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated.

Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A test apparatus for testing universal serial bus (USB) interfaces of an electronic device, the test apparatus comprising:
   a plurality of USB interfaces connected to the USB interfaces of the electronic device, respectively, to communicate with the electronic device;
   a power switch;
   a memory storing a special file to note phrases generated during test; and
   a single-chip connected to the plurality of USB interfaces, the power switch, and the memory, the single-chip storing a preset phrase:
   wherein when the power switch is turned on, the single-chip writes a ready phrase in the special file, and when one of the plurality of USB interfaces of the electronic device passes a test, the single-chip reads a test phrase from the special the and writes a test finish phrase in the special file, and controls the test apparatus to test a next USB interface of the plurality of USB interfaces of the electronic device; and when a current USB interface does not pass the test, the test ends.

2. The test apparatus of claim 1, wherein each generated phrase is appended to the end of the special file without replacing former phrases in the special file, and a space phrase can be inserted into the generated phrases for dividing the generated phrases, when a predetermined file size of the special file is reached, the single-chip outputs a control signal to clear all phrases in the special file.

3. The test apparatus of claim 1, wherein the single-chip is an 8051 type single-chip.

4. The test apparatus of claim 1, wherein the memory is a flash memory.

5. The test apparatus of claim 1, wherein the memory is an exterior storage device, connected to the single-chip.

6. A test method for testing universal serial bus (USB) interfaces of an electronic device, the test method comprising:
   connecting the USB interfaces of the electronic device to USB interfaces of a test apparatus via cables, respectively, and writing a ready phrase in a special file when a power switch is turned on;
   determining whether a motherboard of the electronic device reads the ready phrase from the special file when executing test programs:
   determining that the test apparatus fails in response to the motherboard failing to read the ready phrase from the special file;
   testing one of the USB interfaces of the electronic device and determining whether the USB interface passes test in response to the motherboard reading the ready phrase from the special file;
   displaying fail in response to the test not passing;
   writing a test phrase in the special file in response to the test passing;
   determining whether the test phrase matches a preset phrase stored in a single-chip;
   writing a test finish phrase in the special file and controlling the test apparatus to test a next USB interface and return to testing one of the USB interfaces and determining whether the USB interface passes test, in response to the test phrase not matching the preset phrase;
   writing an end phrase in the special file in response to the test phrase matching the preset phrase; and
   reading the end phrase from the special file and ending test.

* * * * *